United States Patent
Austrheim et al.

(10) Patent No.: US 12,378,069 B2
(45) Date of Patent: Aug. 5, 2025

(54) AUTOMATED STORAGE TOWER WITH CAROUSEL

(71) Applicant: Autostore Technology AS, Nedre Vats (NO)

(72) Inventors: Trond Austrheim, Etne (NO); Ingvar Fagerland, Kolnes (NO)

(73) Assignee: Autostore Technology AS, Nedre Vats (NO)

( * ) Notice: Subject to any disclaimer, the term of this patent is extended or adjusted under 35 U.S.C. 154(b) by 323 days.

(21) Appl. No.: 17/906,434

(22) PCT Filed: Mar. 23, 2021

(86) PCT No.: PCT/EP2021/057502
§ 371 (c)(1),
(2) Date: Sep. 15, 2022

(87) PCT Pub. No.: WO2021/197942
PCT Pub. Date: Oct. 7, 2021

(65) Prior Publication Data
US 2023/0116192 A1    Apr. 13, 2023

(30) Foreign Application Priority Data

Mar. 31, 2020    (NO) .................................. 20200391
Jun. 26, 2020    (NO) .................................. 20200752

(51) Int. Cl.
*B65G 1/04*    (2006.01)

(52) U.S. Cl.
CPC .......... *B65G 1/045* (2013.01); *B65G 2812/99* (2013.01)

(58) Field of Classification Search
CPC .......... A47B 49/008; B65G 1/045; E04H 6/28
See application file for complete search history.

(56) References Cited

U.S. PATENT DOCUMENTS

| | | |
|---|---|---|
| 3,120,824 A | 2/1964 | Loyd |
| 3,198,594 A | 8/1965 | Murray |

(Continued)

FOREIGN PATENT DOCUMENTS

| | | |
|---|---|---|
| CN | 110104360 A | 8/2019 |
| DE | 2421387 A1 | 11/1975 |

(Continued)

OTHER PUBLICATIONS

Machine Translation DE19942584.*

(Continued)

*Primary Examiner* — Mark C Hageman
(74) *Attorney, Agent, or Firm* — Baker Botts L.L.P.

(57) ABSTRACT

A storage tower for storing storage containers includes a vertically extending supporting structure having a vertical axis, and m horizontally oriented container supports arranged along the vertical axis of the supporting structure and supported by container supporting frameworks to provide different levels where storage containers can be stored. The container supports are distributed at vertical intervals and m is a positive integer of 2 or more. Each container support is rotationally connected to the support structure and configured to support at least one storage container. Each level of the l container supports that are arranged above the remaining levels of m–l container supports each displays at least one opening having a size being at least a maximum horizontal cross section of the storage containers to be stored, l being a positive integer of 1 to m–1. The l container supports can be rotated about the vertical axis independently such that at least one opening of each level of the l container supports is vertically alignable with at least one opening of the other levels of the l container supports by individual rotation of the container supports.

27 Claims, 10 Drawing Sheets

(56) References Cited

U.S. PATENT DOCUMENTS

| | | | |
|---|---|---|---|
| 3,730,358 A | 5/1973 | Oji | |
| 4,232,988 A * | 11/1980 | Kochanneck | A47B 51/00 |
| | | | 414/331.03 |
| 4,440,459 A | 4/1984 | Hallgren | |
| 10,086,998 B1 | 10/2018 | Tilekar et al. | |
| 11,453,551 B1 * | 9/2022 | Oittinen | B65G 1/06 |
| 2006/0245859 A1 * | 11/2006 | Frank | E04H 6/14 |
| | | | 414/277 |

FOREIGN PATENT DOCUMENTS

| | | |
|---|---|---|
| DE | 8707014 U1 | 9/1988 |
| DE | 19942584 A1 | 3/2001 |
| DE | 20206193 U1 | 8/2002 |
| DE | 102004053170 A1 | 5/2006 |
| EP | 0246214 A2 | 11/1987 |
| GB | 1124673 A | 8/1968 |
| JP | S62297050 A | 12/1987 |
| JP | H0331105 A | 2/1991 |
| JP | 2002-239208 A | 8/2002 |
| JP | 2003-072905 A | 3/2003 |
| JP | 2004307125 A | 11/2004 |
| JP | 2016-101993 A | 6/2016 |
| JP | 2018-520965 A | 8/2018 |
| NO | 317366 B1 | 10/2004 |
| WO | 0221057 A1 | 3/2002 |
| WO | 2014075937 A1 | 5/2014 |
| WO | 2014090684 A1 | 6/2014 |
| WO | 2015193278 A1 | 12/2015 |
| WO | 2018146304 A1 | 8/2018 |
| WO | 2018233886 A1 | 12/2018 |
| WO | 2019141877 A1 | 7/2019 |

OTHER PUBLICATIONS

Machine Translation DE2421387.*
Machine Translation JP2004307125.*
Machine Translation JPH0331105.*
Machine Translation JPS62294050.*
Nora Lindner, International Preliminary Report on Patentablity for Application No. PCT/EP2021/057502, dated Sep. 29, 2022, 7 pages, pub. by The International Bureau of WIPO, Geneva, Switzerland.
Le Huy Anh, Office Action for Vietnamese Patent Application No. 1202207015, dated Sep. 27, 2024, 4 pages, pub. by Intellectual Property Office of Vietnam, Hanoi, Vietnam.
Search Report issued in Norwegian Application No. 20200391; Dated Oct. 31, 2020 (2 pages).
Search Report issued in Norwegian Application No. 20200752; Dated Jan. 26, 2021 (2 pages).
International Search Report issued in International Application No. PCT/EP2021/057502, mailed Jun. 22, 2021 (5 pages).
Written Opinion issued in International Application No. PCT/EP2021/057502; Dated Jun. 22, 2021 (6 pages).
Wei Lijiao, First Office Action for Chinese Patent Application No. 202180026138.7, dated Jan. 27, 2025, 15 pages, pub. by SIPO, Beijing, China.
Mitsuyoshi Kato, Notice of Reasons for Rejection in Japanese Patent Application No. 2022-558438, dated Mar. 21, 2025, Japan Patent Office, Tokyo, Japan, 21 pages (inclusive of translation).

* cited by examiner

AUTOMATED STORAGE TOWER WITH CAROUSEL

FIELD OF THE INVENTION

The present invention relates to a storage grid, an automated storage and retrieval system for storage and retrieval of containers from/to such a storage grid. The present invention also relates to a method for storing and retrieving containers in such a storage grid to access deeper laying containers in a more time efficient manner.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping l engaging devices which are adapted to engage a storage container 106, and which gripping l engaging devices can be lowered from the vehicle 201,301 so that the position of the gripping l engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

FIG. 4 shows examples of product items 80 stored in a storage container 106. The storage container 106 illustrated in FIG. 4 has a height Hf, a width Wf and a length Lf. The storage container 106 has a horizontal cross section Af.

For systems containing a large number of bins in each stack, the above mentioned 'digging' may prove both time and space consuming when the target bin is located deep within the grid. For example, if the target bin has location Z=5, the vehicle(s) must lift four non-target bins and place them in other positions, often on top of the grid (Z=0), before the target bin can be reached. Before being replaced back into the grid, the non-target bins may force other robots to choose non-optimized paths to execute their respective operations.

An objective of the present invention is therefore to provide a storage tower and a storage and retrieval system using such a storage tower which may provide a more time efficient storage and retrieval method compared to prior art systems.

SUMMARY OF THE INVENTION

The present invention is set forth in the independent claims and the dependent claims describe certain optional features of the invention.

In particular, the invention concerns a storage tower for storing storage containers. The storage tower comprises a vertically extending support structure having a vertical axis and m horizontally oriented container supports, m being a positive integer of 2 or more.

The container supports are arranged along the vertical axis of the supporting structure and supported by container supporting frameworks, the container supports being distributed at vertical intervals to provide different levels where storage containers can be stored, and each container support may be rotationally connected to the support structure and configured to support at least one storage container.

Each level of the l of container supports that are arranged above the remaining levels of m−l container supports each display at least one opening having a size being at least a maximum horizontal cross section of the storage containers to be stored, l being a positive integer of 1 to m−1.

The l container supports can be rotated about the vertical axis independently such that at least one opening of each level of the l container supports is vertically alignable with at least one opening of the other levels of the l container supports by individual rotation of the container supports.

Preferably all container supports of the storage tower can be rotated about the vertical axis independently such that at least one opening of each level of container supports is vertically alignable with at least one opening of the other levels of the container supports by individual rotation of the container supports.

It is thus achieved a storage tower where remotely operated vehicles can pick storage containers to at least level l+1 without digging and thus save time.

It is thus achieved a storage tower that can provide a more time efficient delivery of product items to a customer or other recipient of an item stored in a storage container.

It is thus achieved a storage tower that can provide a high throughput of product items, such as product items on sale or other products with a high demand.

The horizontal container supporting frameworks may have repeating geometry, particularly the l container supports.

The horizontal container supports may be seen to provide a set of rotatable storage shelves for storage containers, the contents of which can be accessed easily through aligning openings in the container supports above with a target storage container below.

The container supports may be a plate, e.g. one continuous plate or several plates connected to form the container support. In other words, the container support may provide a continuous surface on which to place the storage containers. Alternatively, the container support may have a frame structure, i.e. without inner structure or material between frame members of the frame structure. Furthermore, the container support may be a combination of the two. The container supports in the storage tower may also be a mixture of the two.

The at least one opening displayed by each container support may be a separate opening. The opening does not need to be in the actual container support. E.g. the container support may not extend to the area of the opening. If the container support has two or more openings these openings may be merged together to form a continuous opening. The container support may comprise a plurality of openings distributed in an arc on the container support such that the plurality of openings are circumferentially offset with an equal, or near equal, first radial distance from the vertical axis of the supporting structure.

The at least one opening and the container spaces of the same container support may be distributed along the same arc.

The distribution of the at least one opening and the container spaces of each container support are preferably similar for each container support. In this way the container spaces of any container support will be able to perfectly align with the opening of any of the other container supports, when coaxially arranged.

The storage tower may comprise m container supporting frameworks arranged along the vertical axis of the supporting structure and distributed at vertical intervals, m being a positive integer of 2 or more. Each of the container supporting frameworks is configured to support at least one container support.

The container supporting frameworks may be arranged with no space between adjacent container supporting frameworks, e.g. if m−1 of the container supporting frameworks are resting on the one below. Alternatively, the container supporting frameworks may be spaced apart.

The storage tower may comprise a drive mechanism configured to rotate the at least one container support relative to the vertical axis of the supporting structure.

The drive mechanism may e.g. be a swivel drive, gear drive, belt drive, chain drive, electromagnetic drive, such as a stepper motor.

The drive mechanism may e.g. be arranged on the supporting structure, the container support or the container supporting framework.

Typically, all container supports of the tower will be rotatable. However, the lowermost container support may be static if all the above container supports are rotatable and the remotely operated vehicle can be vertically aligned above all potential target storage containers supported on the lowermost container support.

The container support is at least indirectly rotationally connected to the supporting structure, e.g. via the container supporting framework, where the container supporting framework may be connected to the supporting structure in a non-rotating manner.

Each of the m container supports may comprise a plurality of first container spaces distributed in an arc on the container support such that the plurality of first container spaces are circumferentially offset with an equal, or near equal, first radial distance from the vertical axis of the supporting structure.

Each container support may e.g. comprise five first container spaces.

The plurality of first container spaces may be arranged radially symmetrically. However, equal angular spacing between the container spaces is not required.

The container spaces may be configured for storing storage containers arranged with their transverse direction extending radially to the vertical axis of the supporting structure. In this way, the storage containers to be stored or retrieved may be aligned with one or more grid openings of a grid arranged above the storage tower. Alternatively, the container spaces may be configured for storing storage containers arranged with their longitudinal direction extending radially to the vertical axis of the supporting structure. Furthermore, the container spaces may be configured for storing storage containers arranged with any angular displacement relative to the above-mentioned orientations.

Each of the container supports may further comprise a plurality of second container spaces distributed in an arc on the at least one horizontally oriented container support such that the plurality of second container spaces are circumferentially offset with an equal, or near equal, second radial distance from the vertical axis, the second radial distance being larger than the first radial distance. The second radial distance is larger than the first radial distance by at least the width of the container to be stored. The container support may typically comprise seven second container spaces.

Each of the container supports may further comprises a plurality of third container spaces distributed in an arc on the at least one horizontally oriented container support such that the plurality of third container spaces are circumferentially offset with an equal, or near equal, third radial distance from the vertical axis, the third radial distance being larger than the first and second radial distances. The third radial distance is larger than the second radial distance with at least the length of the container to be stored. The container support may typically comprise eleven third container spaces.

Each container support may have a toroid-shaped horizontal cross-section.

The supporting structure may be a central pole or a peripheral housing, or a combination of a central pole and a peripheral housing. The housing may be a cage structure.

At least one of the container supports may comprise a plurality of sensor devices for sensing the presence of a storage container. The sensor devices may be distributed across the plurality of container spaces.

The sensors arranged on the container support or the container supporting framework may communicate with the control system.

The sensor device may be selected from a group comprising piezoelectric sensors, weight sensors, magnetic sensors (would require the storage container to be made of a magnetic material or to be provided with a magnet device), vision sensors, light sensors, motion sensors, electrical contacts and/or induction sensors.

At least one of the container supports may comprise a sensor device for sensing the rotation of the container support relative to the supporting structure.

Each container supporting framework may comprise a plurality of container supports, wherein the plurality of container supports may be coaxially arranged and rotatable relative to each other. In this case the first, second and third container spaces of the same container supporting framework may be distributed across a first, second and third container support respectively.

An advantage of this configuration is that two remotely operated vehicles may simultaneously pick two respective target storage containers from the same storage tower without interrupting each other. If the first remotely operated vehicle is picking a first storage container from a given container support, the second remotely operated container can pick a second storage container or a third storage container from any container support of the same storage tower, including the same container support as the first remotely operated vehicle is picking from.

The plurality of first container spaces of at least one container supporting framework may be distributed on a plurality of container supports. E.g. if each container support is substantially sector-shaped.

Each of the container supporting frameworks may further comprise a static part connected in a non-rotating manner to the support structure. The static part may be provided with a rotational device, e.g. wheels, bearings, swivels, roller. At least one container support may be rotationally coupled to the static part.

It is understood that the term "coupled to" also covers "resting on" and "supported by".

It is understood that the term "connected" also covers "indirectly connected". Such that the container support is considered connected to the supporting structure in cases where the container support is connected to the container supporting structure and the container supporting structure is further connected to the supporting structure, i.e. the container support is connected to the supporting structure via the container supporting structure.

The rotating device may constitute part of the drive mechanism.

The static part may form arms extending horizontally in a radial direction from the vertical axis of the supporting structure. Rotational devices may be arranged on the arms, e.g. at a distal end of the arms. The rotational devices arranged on the arms may be powered to rotate the associated container support and thus constitute drive mechanisms.

Each horizontally extending arm may comprise a plurality of rotational devices configured to support individual container supports and to allow rotation of the individual container supports relative to each other.

The horizontally extending arms may be provided in sets of different lengths, wherein each set is configured for supporting individual coaxially arranged container supports. In this case the first, second and third container supports of the same container supporting framework may be supported by a first, second and third set of arms respectively.

The container supports may comprise guide posts for guiding the storage containers into position on the container space. The storage containers may preferably comprise guide recess configured to cooperate with the guide posts.

The guide posts will also prevent the storage containers from moving on the container support when the container support is rotated, i.e. ensure that the storage containers maintain their position during storage.

Each container support may comprise vertical guide plates arranged at least partly around the perimeter of each of the at least one opening. The vertical guide plates may be configured so that a storage container being lifted or lowered into the respective opening is aligned in the horizontal plane.

The storage tower may further comprise a transport mechanism arranged above the uppermost container supporting framework or the uppermost container support at a first vertical offset being at least a maximum height of the storage containers to be stored.

Instead of a vehicle with wheels moving on a rail system, the transport system may comprise a crane moveable in X and Y-directions (and not strictly in those directions but diagonally in a combination of those directions) over the storage tower. For example, the crane may be moveable in the first direction on a sliding bar extending across the width of the storage tower. Movement in the second direction may be achieved by sliding the sliding bar along two fixed bars extending in the second direction on both sides of the storage tower. Other arrangements and numbers of bars, to the extent that they could be used to achieve the same motion of the overhead crane, are encompassed herein. The crane may be a container handling vehicle with a cantilever construction supported on two parallel sliding bars.

It is thus achieved a storage tower that may operate despite not being level. The transport mechanism is less prone to derailing than the vehicle moving on wheels. The storage tower may thus be suitable for operations at sea, e.g. onboard a vessel.

The storage tower may alternatively comprise a rail system arranged above the uppermost container supporting framework or the upper container support.

The rail system may be arranged above the uppermost container supporting framework or the uppermost container support at a first vertical offset being at least a maximum height of the storage containers to be stored.

The uppermost container supporting framework or the uppermost container support may be arranged at a distance below a lower edge of the above adjacent rail system corresponding to a height that is equal or higher than a maximum height of a stack of several storage containers. In this way one part of the storage tower may partly correspond to the prior art storage grid in that storage containers can be position on top of one another to form a stack, and the remotely operated vehicle may have to dig to reach the target storage container. At the same time, another part of the same storage tower may comprise one or more container supports where storage containers are not stacked such that digging is not required.

The rail system may provide access to the target openings of the storage tower and to adjacent storage towers and/or storage grids without having to cover the entire horizontal extent of the storage tower.

The invention also concerns an automated storage and retrieval system configured to store a plurality of storage containers.

The automated storage and retrieval system may comprise an above-described storage tower.

Furthermore, the automated storage and retrieval system may comprise a plurality of storage containers supported on the plurality of container supports.

Furthermore, the automated storage and retrieval system may comprise a remotely operated vehicle configured to move laterally above at least a part of the plurality of container supports. The remotely operated vehicle may comprise a lifting device configured to grab and vertically lift and lower a storage container.

Furthermore, the automated storage and retrieval system may comprise a control system configured to monitor and control wirelessly movements of the remotely operated vehicle.

The remotely operated vehicle can be a storage container vehicle or a crane.

It is thus achieved an automated storage and retrieval system where remotely operated vehicles can pick storage containers without having to dig.

It is thus achieved an automated storage and retrieval system that can provide a more time efficient delivery of product items to a customer or other recipient of an item stored in a storage container.

It is thus achieved an automated storage and retrieval system that can provide a high throughput of product items, such as product items on sale or other products with a high demand.

The automated storage and retrieval system may further comprise a storage grid comprising:
  a plurality of vertical storage columns for stacking storage containers on top of one another, and
  a rail system on which a plurality of container handling vehicles may be operated, the rail system may be arranged above the plurality of storage columns,
  wherein storage containers stored in the storage columns are accessible by the container handling vehicles through grid openings in the rail system, the rail system may comprise a cantilever part with a horizontal extent being equal to the difference between the horizontal extent of the rail system and the horizontal extent of the plurality of storage columns.

One or more of the storage towers may at least be partly arranged below the cantilever part of the rail system and positioned such that the l container supports can be rotated about the vertical axis independently such that at least one opening of each of the l container supports is vertically alignable with at least one opening of other of the l container supports by rotation of the container support.

Alternatively, the automated storage and retrieval system may further comprise a storage grid comprising:
  a plurality of vertical storage columns for stacking storing containers one on top of one another, and
  a transport mechanism wherein the remotely operated vehicle is a crane being moveable along a sliding bar arranged in parallel to the first direction, the sliding bar having two opposite ends being movable along two fixed bars arranged in parallel to the second direction, the transport mechanism being arranged above the plurality of storage columns,
  the transport mechanism comprises a cantilever part with a horizontal extent being equal the difference between the horizontal extent of the transport mechanism and the horizontal extent of the plurality of storage columns.

One or more of the storage towers may be at least partly arranged below the cantilever part of the traveling crane system.

It is thus achieved a storage and retrieval system combining the prior art storage grid and the inventive storage tower, i.e. a combination of a high runner tower and a low runner grid in which product items can be arranged according to their turnover.

It is thus achieved a storage and retrieval system combining storage capacity with time efficient delivery of product items to a customer, e.g. where orders can be picked from the low runner grid, with high storage capacity, before intermediately stored (buffered) in the high runner grid, with time efficient delivery of product items to the customer, and subsequently efficiently delivered to the customers on their arrival.

A high runner storage tower is configured for high frequency of storage containers entering and leaving the storage tower. The storage containers will typically be stored for a shorter period in the high runner storage tower when compared to a low runner storage grid. The high runner storage tower is particularly suited for high demand products. The high runner storage tower provides quick access and is therefore suited for time critical storages. The high runner storage tower is less space efficient than a low runner storage grid.

A low runner storage grid is more space efficient when compared to the high runner storage tower. The storage containers will typically be stored for a longer period in the lower runner grid when compared to a high runner storage tower. The low runner storage grid has slower access compared to the high runner storage tower and is therefore better suited for a less time critical storage.

Hence, the high runner storage tower and the low runner storage grid complement each other.

The automated storage and retrieval system may further comprise a rail system arranged above the uppermost container supporting framework or the uppermost container support. The rail system may be arranged above the uppermost container supporting framework or the uppermost container support at a first vertical offset being at least a maximum height of the storage containers to be stored.

The automated storage and retrieval system may alternatively comprise a transport mechanism arranged above the uppermost container supporting framework or the uppermost container support of the storage tower at a first vertical offset being at least a maximum height of the storage containers to be stored.

At least one of the container supporting frameworks or container supports may be arranged at a distance below a lower edge of the above adjacent rail system corresponding to a height that is equal to or higher than a maximum height of a stack of several storage containers.

The invention also concerns a method for storing and retrieving storage containers from an automated storage and retrieval system. The automated storage and retrieval system may be one as described above.

Each of the container supports may comprise a plurality of first container spaces distributed on the at least one horizontally oriented container support such that the plurality of first container spaces are circumferentially offset with an equal to, or near equal, first radial distance from the vertical axis.

The method comprises the following steps:
Moving the remotely operated vehicle or the crane to a position where its lifting device can be aligned vertically with a target storage container positioned on one of the first container spaces or to a position where its lifting device can be aligned vertically with one or more aligned openings of the container supports.
Where necessary, rotating the container support on which the target storage container is supported to position the target storage container in vertical alignment below the position of the remotely operated vehicle or the crane.
Where necessary, and if the container support on which the target storage container is supported is not the uppermost container support, rotating the above container support, or each of the above container supports, to a circumferential position in which the lifting device has direct vertical access to the target storage container through the at least one opening.
Grabbing and lifting the target storage container by use of the lifting device.
Moving the remotely operated vehicle with the target storage container to a horizontally different location.

Preferably, the container supports may have default positions in the storage tower where the at least one opening of each of the l container supports are vertically aligned. Furthermore, when a rail system is used, the default position of these aligned openings of the l container supports may preferably be vertically aligned with a grid opening of the rail system. Alternatively, if a transport mechanism is used, the default position of these aligned openings of the l container supports may preferably be vertically alignable with and has the same horizontal orientation as the lifting device of the crane.

It is thus achieved a method for picking storage container with remotely operated vehicles without having to dig.

It is thus achieved a method providing a more time efficient delivery of product items to a customer or other recipient of an item stored in a storage container.

It is thus achieved a method providing a high throughput of product items, such as product items on sale or other products with a high demand.

If each of the container supports comprises a plurality of second container spaces, and possibly also third container spaces, two remotely operated vehicles may simultaneously pick target storage containers from the same container support. Alternatively, two remotely operated vehicles may simultaneously store two storage containers in the same container support. As a further alternative, one remotely operated vehicle may be retrieving a target storage container from the same container support as another remotely operated vehicle simultaneously is storing a storage container.

If the remotely operated vehicle or the crane is carrying a storage container to be stored in the automated storage and retrieval system, either before or after retrieval of the target storage container, the method may comprise the steps of:
Moving the remotely operated vehicle or the crane to a position where its lifting device can be aligned vertically with a vacant container space, e.g. one of the first container spaces, or to a position where its lifting device can be aligned vertically with one or more aligned openings of the container supports.
Where necessary, rotating the container support of the vacant container space to position the vacant container space in vertical alignment below the position of the remotely operated vehicle or the crane.
If the container support of the vacant container space is not the uppermost container support, rotating the above container support, or each of the above container supports, to a circumferential position in which the lifting device has direct vertical access to the vacant container space through the at least one opening.
Lowering the carried storage container into position on the vacant container space by use of the lifting device.

If the automated storage and retrieval system comprises a storage grid containing a target storage container, the method may comprise the steps of:
Picking the target storage container from the storage grid, e.g. as described in the background section.
Storing the target storage container in the storage tower according to the above-described method.
Retrieving the storage container from the storage tower according to the method for storing and retrieving storage containers.

The above-described automated storage and retrieval system may be used for delivering items arranged within the storage containers stored in the storage tower directly to end users.

The invention also concerns a method for installing a storage tower in an automated storage and retrieval system. The storage tower and the automated storage and retrieval system may be one in accordance with the above description.

The automated storage and retrieval system may comprise:
a storage grid, and
a vehicle movements system having a larger horizontal extent than the storage grid.

The method comprises the steps of:
assembling at least a part of the storage tower according to the above description underneath the cantilever part of the vehicle movement system.

It is thus achieved a storage tower that can be retrofitted to existing storage and retrieval systems.

The vehicle movement system may comprise a rail system, and the method may then further comprise the step of:
aligning the storage tower with the rail system such that the at least one opening of the first container supporting framework and each of the m−1 uppermost container supporting frameworks is alignable vertically below a grid opening of the part of the rail system extending beyond the storage grid.

The cantilever part of a rail system does not need to extend the entire horizontal extent of the storage tower. The cantilever part of the rail system may e.g. only extend enough to reach the target openings of the storage tower.

Due to the configuration of the container supports, vertical pillars cannot be positioned inside the storage tower. This means that there will be a larger span between the vertical pillars of the storage tower, and thus higher loads on each vertical pillar as compared to the upright members of the prior art storage grid.

The rail system, when it is present, must extend over and support the weight of the remotely operated vehicles over a larger area than with a conventional storage grid where each grid space is being supported at the corners by upright members.

To withstand the increasing loads, the vertical pillars and/or the rail system may need to be reinforced as compared to the prior art upright members and rail system.

A remotely operated vehicle approaching the storage tower to pick a target storage container typically brings another storage container that is to be stored in the storage and retrieval system. Before the remotely operated vehicle can pick the target storage container, the vehicle held storage container is advantageously placed in a vacant container space within the same storage tower. This is a process typically referred to as an exchange process. Such an exchange process can take place in the storage tower and the automated storage and retrieval system as described above.

By having fewer storage containers than there are available container spaces within the storage system, there will always be at least one vacant container space. Vacant container spaces will also be dynamically generated as remotely operated vehicles pick storage containers from within the storage tower. If there are no vacant container spaces in the storage system, the remotely operated vehicle must either refrain from bringing another storage container from, for example, the port column or place the held storage container on top of the storage tower. Both alternatives suffer disadvantages in respect of time efficiency.

The vacant container space (into which the storage container is to be placed) and the target storage container are preferably horizontally closest to the same target opening.

In this way the remotely operated vehicle does not need to move between the two operations during the same exchange process. Even more preferred, in addition to being available through the same target opening, the vacant container space and the target storage container can be located on the same container support. In this way the remotely operated vehicle can have a minimum movement of its lifting device between the two operations of the exchange process. Thus, the exchange process time will not be prolonged due to conflicting displacements of the lifting device and the container support of the target storage container.

After the remotely operated vehicle has position the previously held storage container in the vacant container space, the remotely operated vehicle must retract the lifting device. By retracting the lifting device, the container support on which the previously held storage container is position is allowed to rotate, i.e. return to a predetermined default orientation. The default positions of the container supports are typically one where at least one opening of each container support are vertically aligned. For a time-efficient operation, the remotely operated vehicle should not retract, i.e. elevate, the lifting device higher than strictly necessary. If the target storage container is positioned deeper in the storage tower than the position of the previously held storage container, the lifting device only needs to be lifted clear of the container support on which the previously held storage container is positioned. If the target storage container is positioned higher in the storage tower than the position of the previously held storage container, the lifting device needs to be lifted clear of the container support on which the target storage container is position in order for it to be rotated. However, there is no need for the lifting device to be lifted any higher. Retracting the lifting device all the way up to the remotely operated vehicle is thus not required unless the target storage container or the vacant container space is positioned in the uppermost container support. For a time-efficient operation, the container support of the target storage container and the container support of the previously held storage container can be rotated simultaneously.

After the target storage container has been lifted above the container support, the container support can be rotated back to its initial position.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
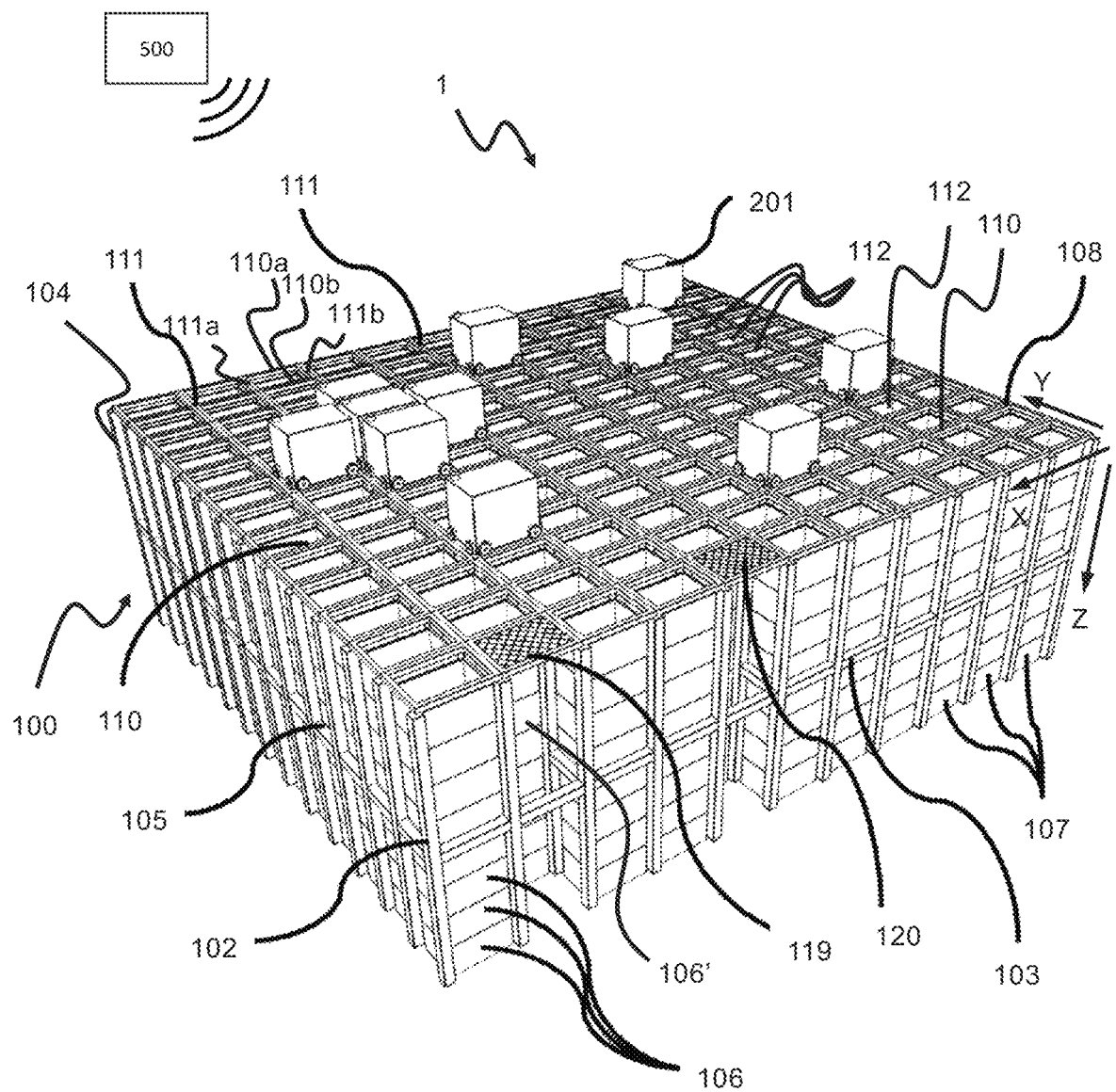
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
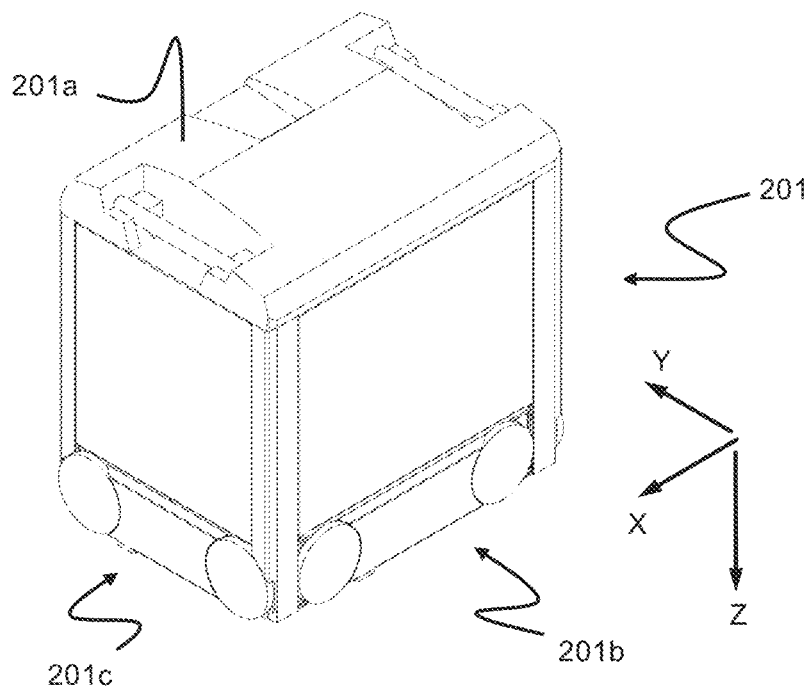
FIG. 2 is a perspective view of a prior art container handling vehicle having a centrally arranged cavity for carrying storage containers therein.
Figure 3:
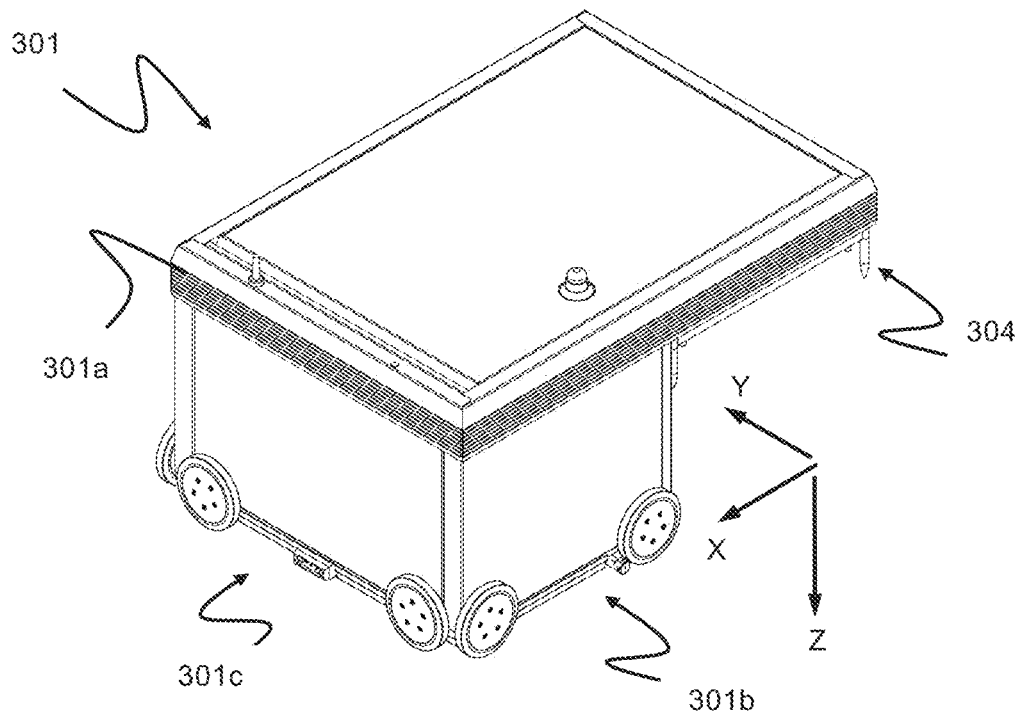
FIG. 3 is a perspective view of a prior art container handling vehicle having a cantilever for carrying storage containers underneath.
Figure 4:
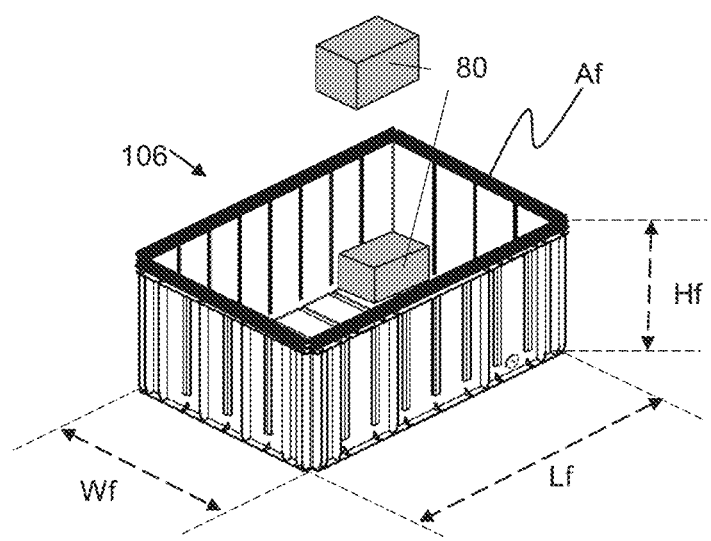
FIG. 4 is a perspective view of a storage container and product items stored in the storage container.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Embodiments of the automated storage and retrieval system according to the invention will now be discussed in more detail with reference to FIGS. 5a to 15.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

With particular reference to FIG. 5-6 and FIG. 9-15, the inventive storage and retrieval system 1 comprises remotely operated vehicles 301 operating on a rail system 408 comprising a first set of parallel rails 410 arranged to guide movements of the remotely operated vehicles 301 in a first direction X across a storage grid 400 and a second set of parallel rails 411 arranged perpendicular to the first set of rails 410 to guide movement of the remotely operated vehicles 301 in a second direction Y which is perpendicular to the first direction X. The storage containers 106 stored within the storage tower 400 are accessed by the remotely operated vehicles 301 through grid openings 415 in the rail system 408. Each grid opening 415 of the rail system 408 is enclosed by a grid cell 422. The rail system 408 extends in a horizontal plane $P_{rs}$ (see FIG. 7).

Figure 9:
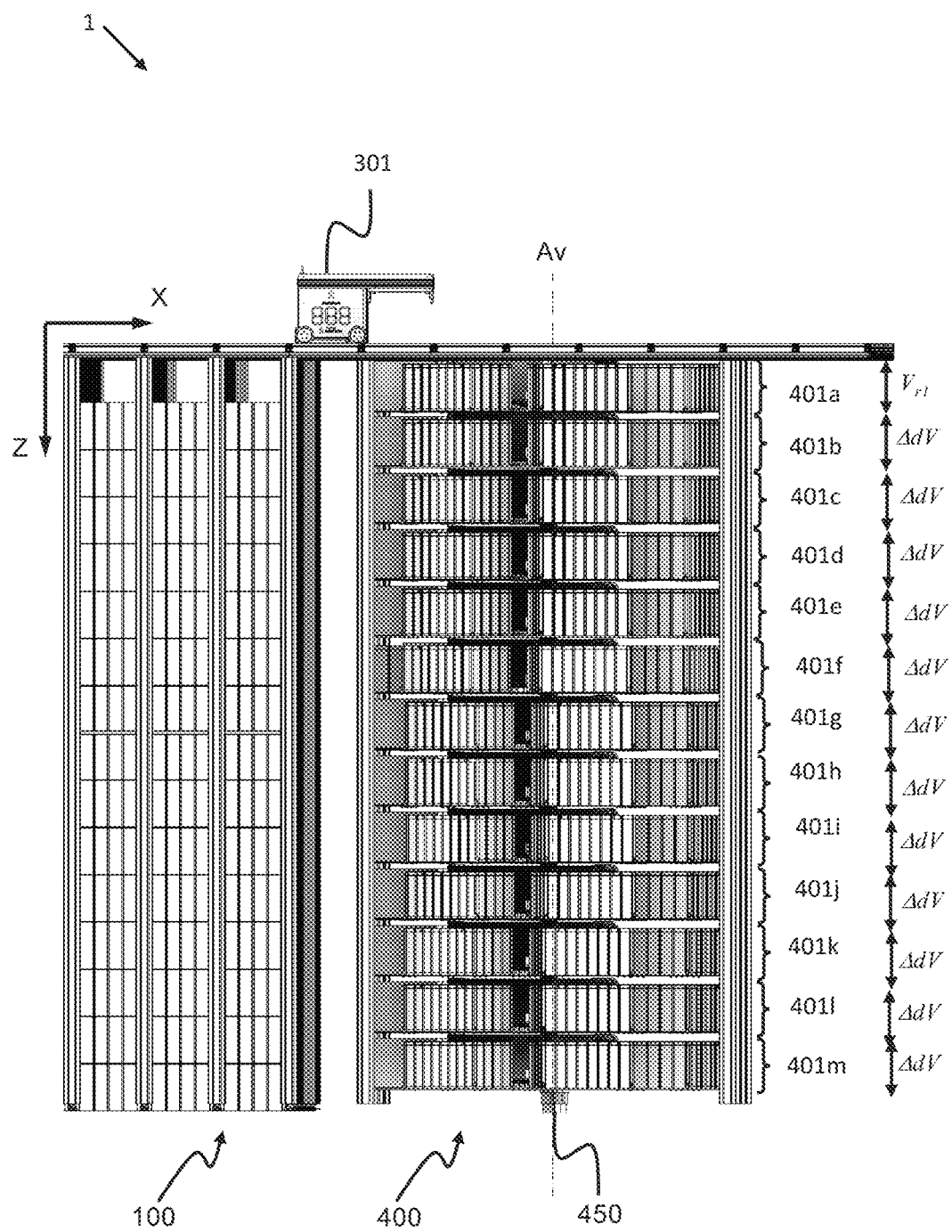
FIG. 9 is a side view of a storage system in accordance with an embodiment of the invention, where a storage grid and a storage tower are positioned side by side and below a rail system.

As best seen in FIG. 9, the storage containers 106 are stored on a plurality of container supports 402 distributed in a Z direction below the rail system 408 with a vertical offset indicated by $V_{rl}$ (i.e. the offset between the lower edge of the rail system 408 and the lower edge for the first container support 402a directly beneath the rail system 408) and a vertical offset indicated by $\Delta dV$ (i.e. the average offset between the lower edges of the adjacent deeper laying container supports 402b-m).

While "m", the thirteenth letter of the alphabet, has been used to identify the lowest container support, and in the embodiment of FIG. 9 represents the thirteen level of container supports, there may be other numbers of levels of container supports in the storage and retrieval system. Accordingly, m is not restricted to the number thirteen but can equal any integer equal to two or more.

The vertical offsets $V_{rl}$ and $\Delta dV$ may be selected to provide a height that is equal to or higher than a maximum height of one storage container 106 or a stack 107 of several storage containers 106. As an example, the first container support 402a may be adapted to store stacks 107 of storage containers 106 while the below situated container supports 402b-m (or some of them) may be adapted to store single (unstacked) storage containers 106. As a further example, several or all container supports 402 of the tower 400 may be adapted to store stacks 107 of several storage containers 106. The different container supports 402 of the same storage tower 400 may be configured to store stacks 107 of unequal numbers of storage containers 106. The vertical space (i.e. the available height) required for one or several container supports 402 of the storage tower 400 to be adapted to store a stack 107 of several storage containers 106 may be obtained by reducing the total number of container supports 402 as compared to a configuration of the storage tower 400 where all container supports 402 are adapted to store single (unstacked) storage containers 106.

Figure 5A:
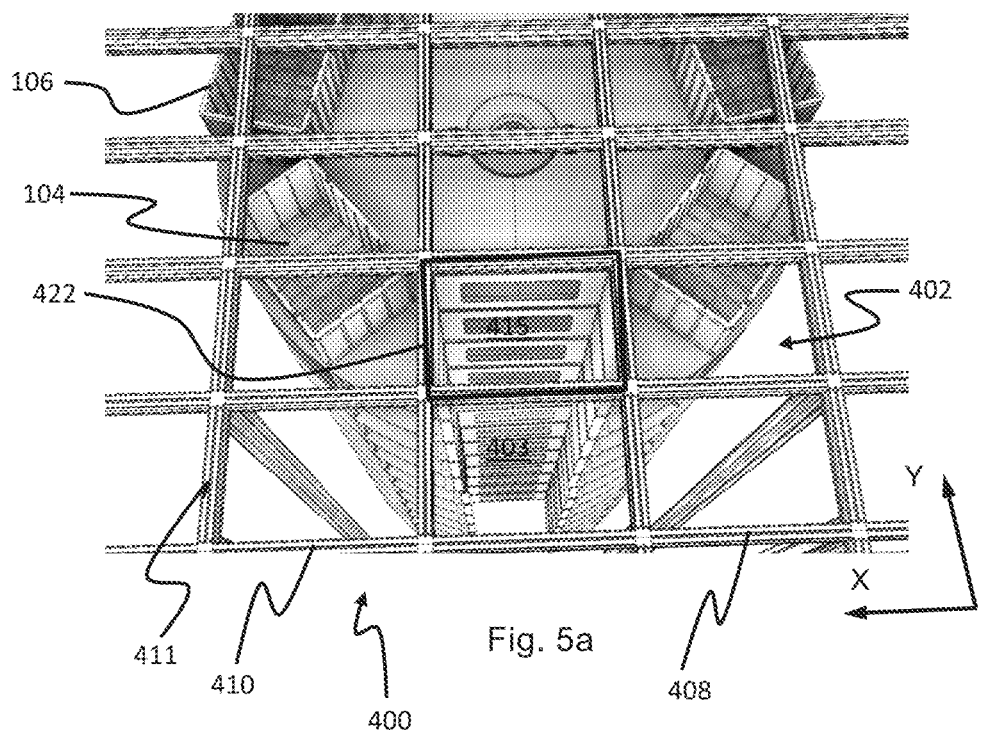
FIG. 5a is a top view of a storage system where a rail system is arranged above a storage tower and openings of each container support are vertically aligned below a grid opening in the rail system.
Figure 5B:
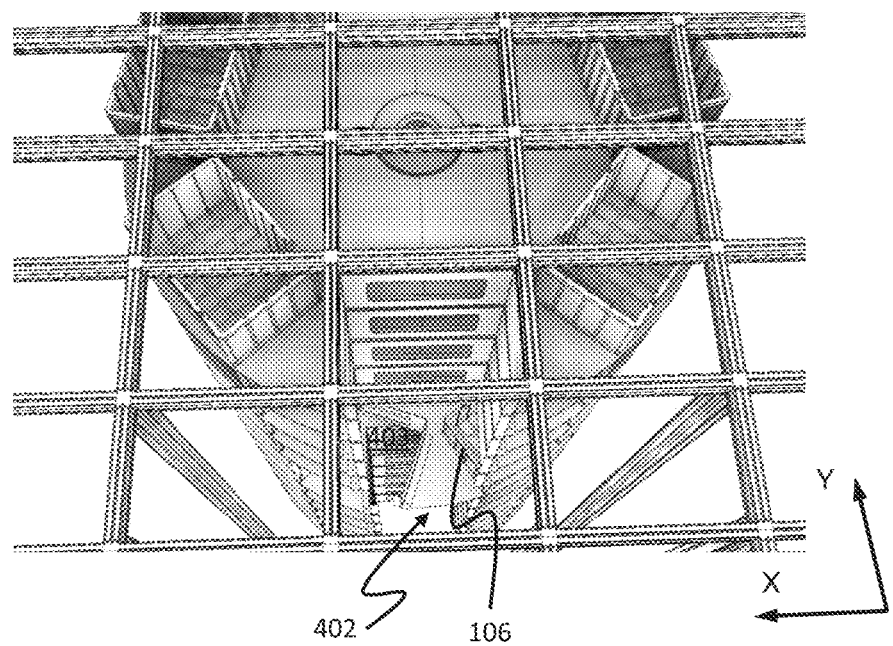
FIG. 5b is a top view of the storage system of FIG. 5a, where one container support is being rotated relative to the other container supports.
Figure 5C:
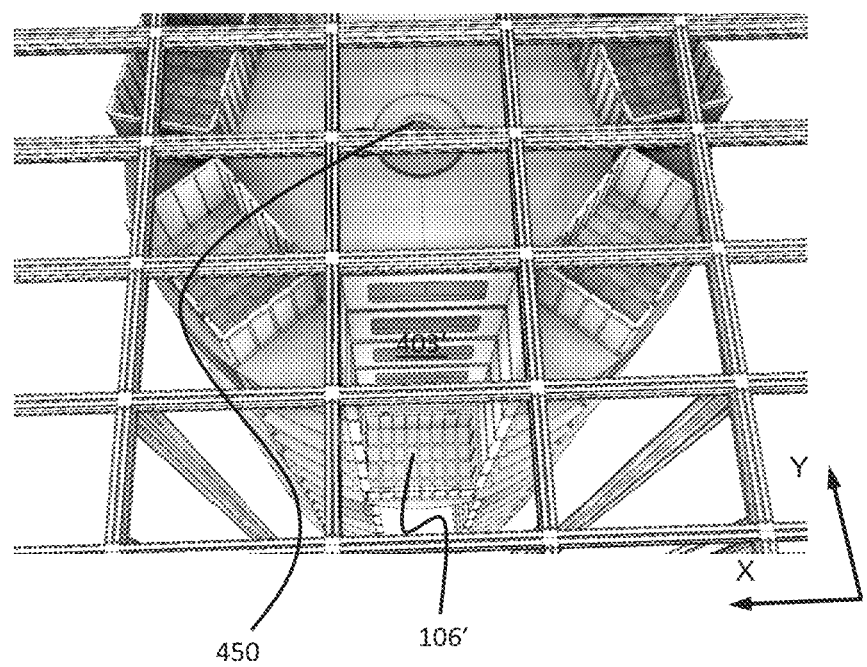
FIG. 5c is a top view of the storage system of FIGS. 5a-b, where one of the container supports is rotated relative to the other container supports such that a storage container is vertically aligned with the grid opening and the openings of the above arranged container supports.
Figure 6:
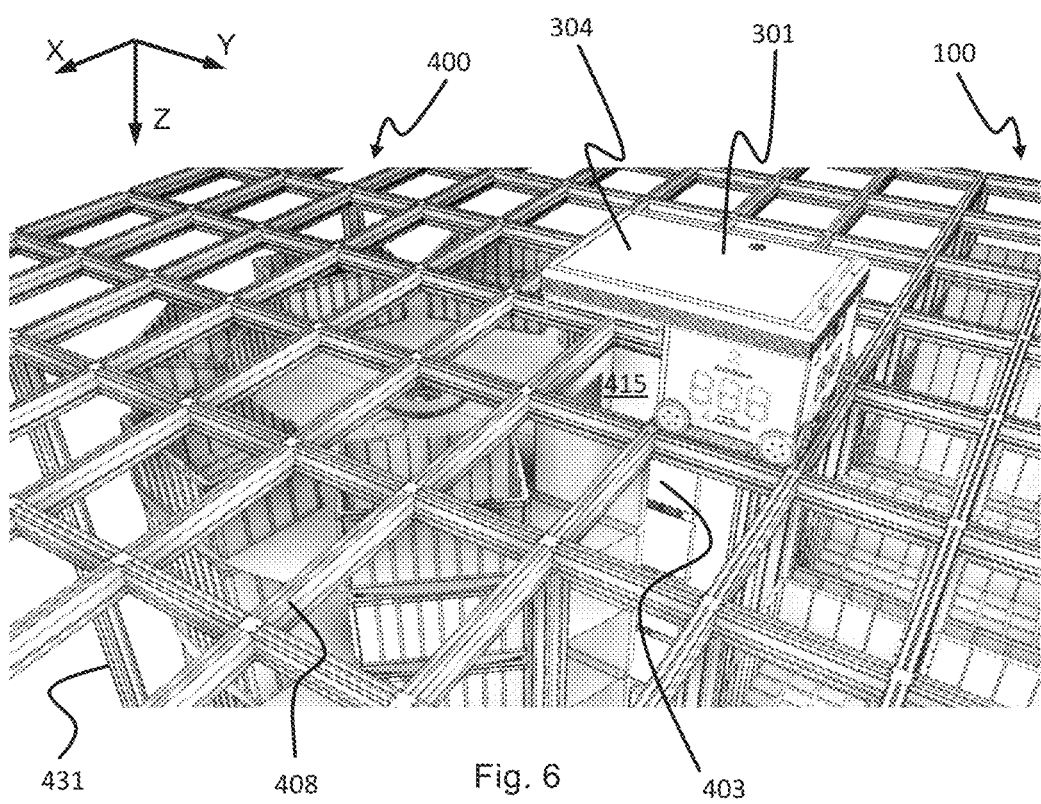
FIG. 6 is a perspective view of the storage system of FIGS. 5a-c, where a remotely operated vehicle having a lifting device and being movable on the rail system is positioned with the lifting device in vertical alignment above the grid opening.

FIGS. 5a-c show top views of a storage tower 400 comprising a vertically extending support structure 450 having a vertical axis $A_v$. A plurality of horizontally oriented container supports 402a-m are arranged along the vertical axis of the supporting structure 450 and distributed at vertical intervals $\Delta dV$, as described above. Each container support 420 is rotationally connected to the support structure 450 and configured to support at least one storage container 106.

The l container supports 402a-1 arranged above the remaining m–l container supports 402 each displays at least one opening 403 having a size being at least a maximum horizontal cross section $A_f$ of the storage containers 106 to be stored.

As with the integer "m", the integer "l" is not restricted to any particular integer but may comprise any integer less than "m".

The l container supports 402a-1 can be rotated about the vertical axis $A_v$ independently such that at least one opening 403 of each of the m container supports 402a-m is vertically alignable with at least one opening of the other m container supports 402a-m by individual rotation of the container supports 402a-m.

The storage tower 400 may comprise a plurality of container supporting frameworks 410a-m configured to support at least one container support 402 each.

Figure 11:
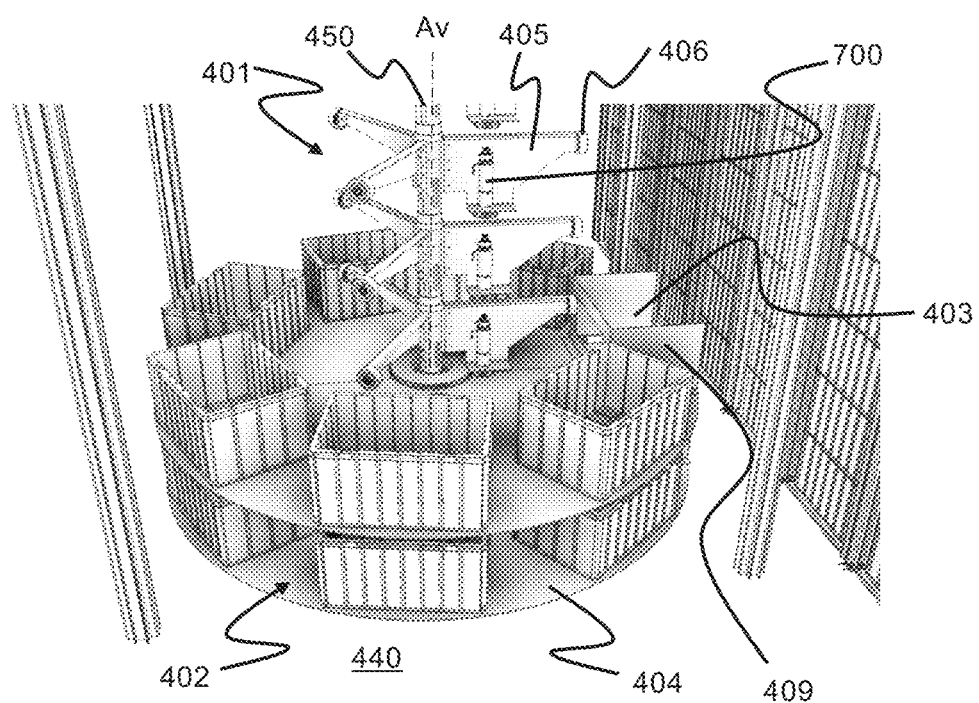
FIG. 11 is a perspective view of a detail of the storage system of FIG. 9 where all container supports apart from the two lowermost are removed from the storage tower.

Each container support 402 may comprise a plurality of first container spaces 104a distributed in an arc on the container support 402 such that the plurality of first container spaces 104a are circumferentially offset with an equal, or near equal, first radial distance $r_1$ from the vertical axis $A_v$ of the supporting structure 450. In the example of FIG. 11, the container support 402 comprises six first container spaces 104a and one opening 403.

The container spaces 104 of the container support 402 may be configured for storing storage containers 106 arranged with their transverse direction (width) extending radially to the vertical axis Ay of the supporting structure 450. In this way the storage containers 106 to be stored or retrieved may be vertically aligned with one or more grid openings 415 of a rail system 408 arranged above the storage tower 400 (the length and width of the grid opening 415 being aligned with the length and width of the storage container 106). If one of the first container spaces 104a is vertically aligned with a grid opening 415, the other first container spaces 104a can be vertically aligned with the same grid opening 415 by rotation of the container support 402.

Figure 7:
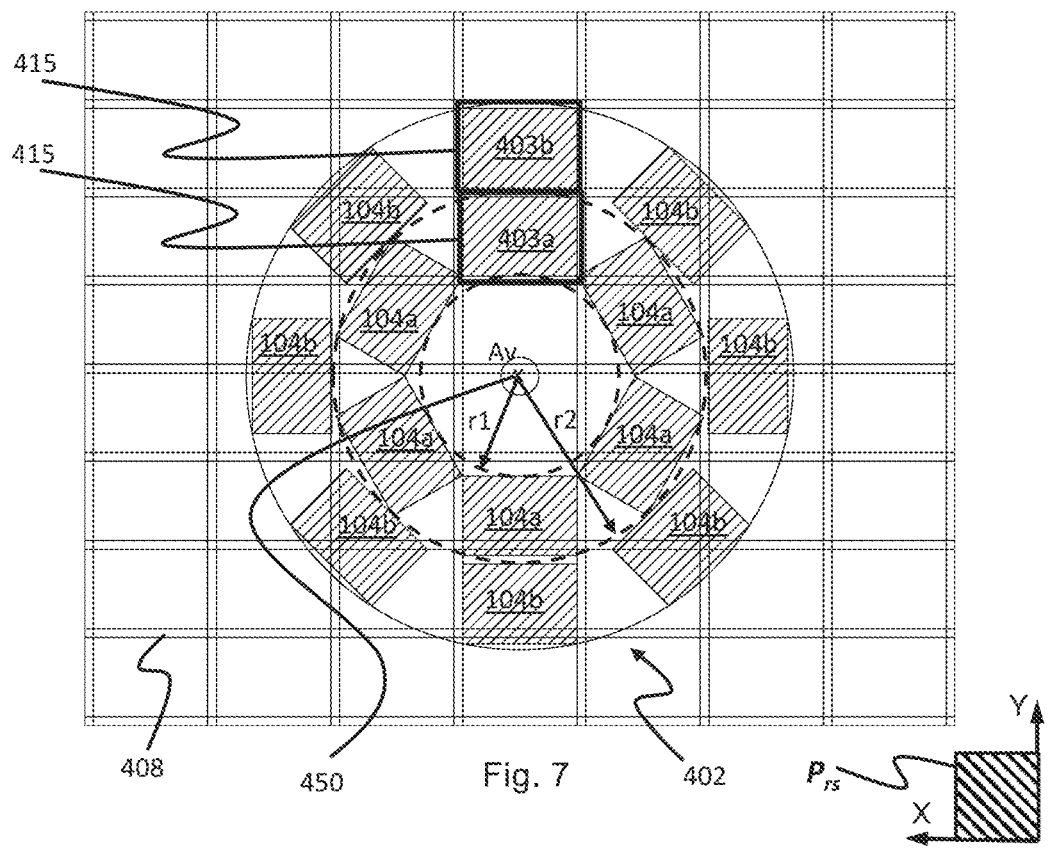
FIG. 7 is a top view of a storage system where the container supports are configured with container spaces and/or openings being alignable below two different grid openings.

FIG. 7 shows that a container support 402 may comprise a plurality of first container spaces 104a distributed in an arc on the container support 402 such that the plurality of first container spaces 104a are circumferentially offset with an equal, or near equal, first radial distance $r_1$ from the vertical axis $A_v$ of the supporting structure 450. The container support 402 of this example comprises five first container spaces 104a and one first opening 403a.

FIG. 7 also shows that the container support 402 may comprise a plurality of second container spaces 104b distributed in an arc such that the plurality of second container spaces 104b are circumferentially offset with an equal, or near equal, second radial distance $r_2$ from the vertical axis $A_v$, the second radial distance $r_2$ being larger than the first radial distance $r_1$. The second radial distance $r_2$ is larger than the first radial distance $r_1$ by at least the width of the storage container 106 to be stored. The container support 402 of this example comprises seven second container spaces 104b and a second opening 403b.

Figure 8:
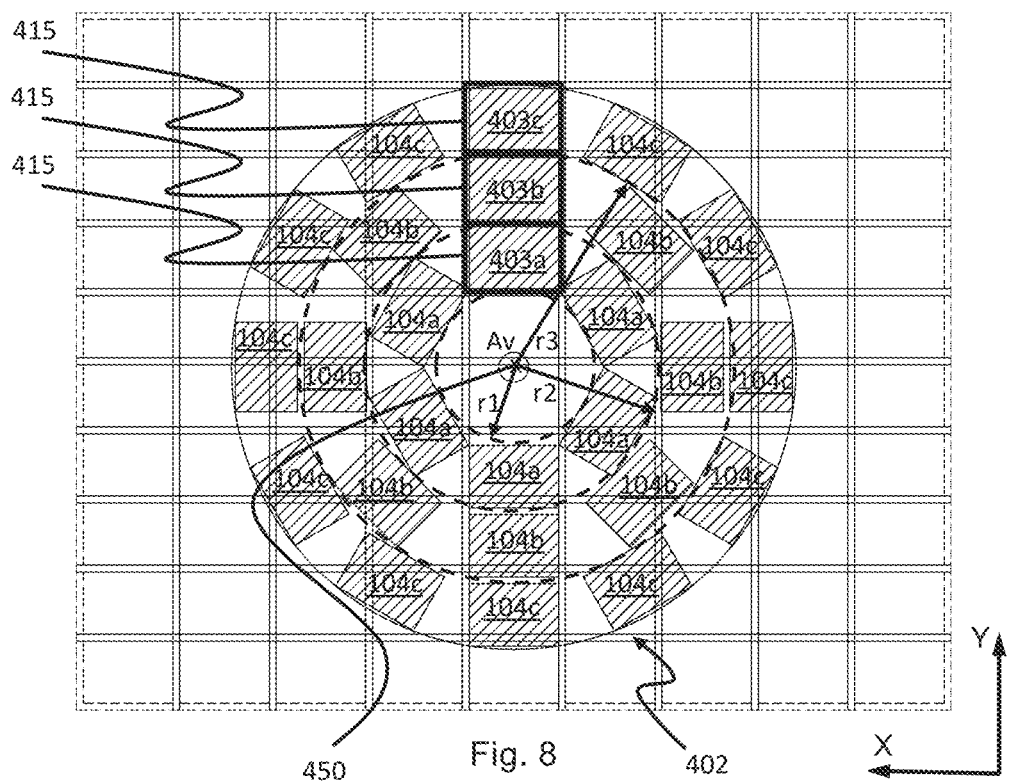
FIG. 8 is a top view of a storage system where the container supports are configured with container spaces and/or openings being alignable below three different grid openings.

FIG. 8 shows that the container support 402 of FIG. 7 may further comprises a plurality of third container spaces 104c distributed in an arc on the at least one horizontally oriented container support 402 such that the plurality of third container spaces 104c are circumferentially offset with an equal, or near equal, third radial distance $r_3$ from the vertical axis $A_v$, the third radial distance $r_3$ being larger than the first and second radial distances $r_1, r_2$. The third radial distance $r_3$ is larger than the second radial distance $r_2$ with at least the length of the storage container 106 to be stored. The container support 402 of this example comprises eleven third container spaces 104c and a third opening 403c.

The number of first, second and third container spaces 104c may vary e.g. depending on the size of the container support 402 and the storage containers 106.

As illustrated, the container supports 402 may preferably have a toroid-shaped horizontal cross-section. All container supports 402 will typically have the same geometry. The lowermost container support 402 will typically differ from the others in that it does not have an opening 403, as there are no storage containers 106 or container spaces 104 to be reached below this container support 402.

In the exemplifying drawings the supporting structure 450 is a central pole. However, other arrangements are envisaged where the container supports are mounted on circumferential bearings provided in a cylindrical framework encircling the container supports.

When arranged in a container supporting framework 401, the container supports 402 of FIG. 7 and FIG. 8 may be divided into a plurality of container supports 402 coaxially arranged in the same container supporting framework 401. The container supports 402 of the same container supporting framework 401 may then be rotatable relative to each other. In this case the first, second and third container spaces 104c of the same container supporting framework 401 may be distributed across a first, second and third container support 402 respectively.

Alternatively, the container supports 402 may be divided into segments such that the plurality of first container spaces 104a are distributed on a plurality of container supports 402. A gap between a pair of segments may provide the opening for a storage container 106 to pass through.

FIG. 11 shows that the storage tower 400 may comprise a drive mechanism 700 configured to rotate the at least one container support 402 relative to the vertical axis $A_v$ of the supporting structure 450.

In FIG. 11 some of the container supports 402 are removed for illustrative purposes. The drive mechanism 700 may be connected to the support structure 450, the container supporting framework 401 or the container support 402. In FIG. 1 the drive mechanism 700 is connected to a part of the container supporting framework 401 forming arms 405 extending horizontally in a radial direction from the vertical axis $A_v$ of the supporting structure 450.

The drive mechanism 700 may e.g. be a swivel drive, gear drive, belt drive, chain drive, electromagnetic drive such as a stepper motor.

Typically, all container supports 402 of the storage tower 400 will be rotatable. However, the lowermost container support 402 may be stationary if all the above container supports 402 are rotatable and the remotely operated vehicle can be vertically aligned above all potential target storage containers 106' supported on the lowermost container support 402.

The container support 402 is at least indirectly rotationally connected to the supporting structure 450, e.g. via the container supporting framework 401, where the container supporting framework 401 may be connected to the supporting structure 450 in a non-rotating manner. In that case the container supporting framework 401 can be considered a static part of the storage tower 400.

FIG. 11 shows that the drive mechanism 700 may be connected to a static part (e.g. the container supporting framework) and configured to rotate the container supports 402 by means of a gear drive. The container support 402 may have a gear arranged close to its centre as in FIG. 11 or the gear may be arranged closer to or on its perimeter.

Figure 12:
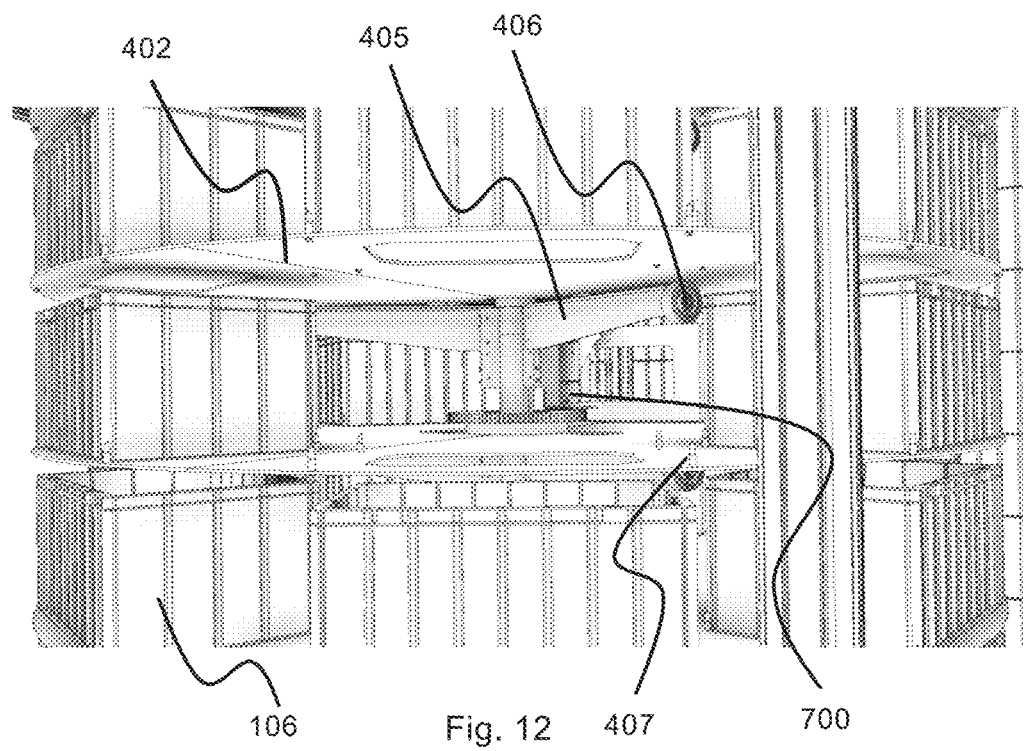
FIG. 12 is a side view of a detail of the storage system of FIG. 9 showing a container supporting framework and a drive mechanism of the storage tower.

FIG. 12 shows that the framework 401 may be used to support one container support 402. To allow rotation of the container support 402 relative to the container supporting framework 401, the container supporting framework 401 may be provided with one or more rotational devices 406. The rotational device 406 may be wheels, bearings, swivels, rollers. The container support 402 may then be considered rotationally coupled to the static part, in this case the container supporting framework 401. In an alternative configuration, the container supports 402 may be provided with such rotational devices and arranged to run over a surface or track provided by the container supporting framework.

The rotational device 406 may be power to rotate and thus constitute the drive mechanism 700.

In FIG. 12, rotational devices 406 are arranged in a distal portion of the arms 405.

If one container supporting framework 401 comprises a plurality of coaxially arranged container supports 402, as described above, each arm 405 may need a corresponding number of rotational devices 406. The rotational devices 406 should then be arranged at radial distances from the vertical axis $A_v$ of the supporting structure 450 corresponding to the horizontal extension of the container supports 402 (e.g., the radially inner and outer extents of the container supports).

Alternatively, each of the plurality of container supports 402 may have dedicated arms 405, e.g. of different lengths according to the horizontal extent of the container support 402 or having the same lengths but rotational devices 406 arranged at different positions according to the horizontal extent of the container support 402 to be rotationally connected.

The container supports 402 may comprise guide posts 407 for guiding the storage containers 106 into position on the container space 104. The storage containers 106 may preferably comprise guide recesses configured to cooperate with the guide posts 407.

The container supports 402 may have cut-outs, e.g. in the container spaces 104. These cut-outs will reduce the weight and may reduce the cost of the container support 402.

In order to store and retrieve a target storage container 106' using the storage tower 400, the following operations are performed (with reference to FIG. 6 and FIGS. 5a-c).

The control system 500 gives instructions to the vehicle 301 to pick up a target storage container 106' with coordinates X,Y,Z. This position corresponds to a storage container 106 positioned in a container space 104 of a container support 402g at a depth of 5×ΔdV+Vrl below the rail system 408. Since all the openings 403 in the storage tower 400 are initially aligned (with same X-Y coordinates), the X-Y position of the target opening 403' of the container support 402a adjacent the rail system 408 is equal to the X-Y positions of the target openings 403' of the underlying container support frameworks 401b-m.

The vehicle 301 moves by aid of its drive means 301b,c in the X and Y directions until its lifting device 304 is located directly above the target opening 403'.

During and/or after movement of the vehicle 301 to the position above the target opening 403', the control system 500 sends an instruction to the drive mechanism 700 to rotate the container support 402g such that the target storage container 106' is vertically aligned with the target openings 403' of the above situated container supports 402a-f.

During and/or after the displacement of the container support 402g, the lifting device 304 of the vehicle 301 is activated and lowered down through the grid opening 415 and the aligned target openings 403' until the gripping part of the lifting device 304 is in position to grip the target storage container 106'.

After the target storage container 106' has been gripped by the lifting device 304 and lifted above the above situated container support 402f, the drive mechanism 700 is again activated in order to move the container support 402g back to its initial position.

When the target storage container 106' has been lifted above the rail system 408, the vehicle 301 is moved to another location on the rail system 408, for example to a dedicated port column 1 chute for delivery to an access station.

The process has the advantage that the need for digging performed for prior art storage and retrieval system is no longer necessary.

FIGS. 5a-c show a grid opening 415 through which the lifting device 304 can access storage containers 106. Storage containers 106, openings 403 and containers spaces 104 of the container supports 402 can be vertically aligned with this grid opening 415. Due to the rotational movement of the container support 402 and the rectangular shape of the grid opening 415, the storage containers 106, openings 403 and container spaces 104, not all grid openings 415 are suitable access points. In some cases, only one grid opening 415 is a suitable access point for the entire 360 degrees rotation of the container support 402. By adjustment of the size of the storage containers 106, openings 403, container spaces 104 and/or the grid openings 415, two suitable access points can be provided with 180 degrees offset. By further making the storage containers 106, openings 403, container spaces 104 and grid openings 415 square, four suitable access points can be provided with 90 degrees offset. This is based on container supports 402 only having a plurality of first container spaces 104a. Container supports 402 having also a plurality of second storage spaces 104b may have twice as many access points. Container supports 402 having also a plurality of third storage spaces 104c may have three times as many access points, etc.

FIG. 9 shows a side view of a storage and retrieval system 1 with one inventive storage tower 400 and one prior art storage grid 100. The above-mentioned drive mechanism 700 are arranged close to the centre of each container support 402. This particular configuration comprises thirteen container supports 402a-m arranged beneath a rail system 408. The container supports 402a-m are arranged in corresponding number of container supporting frameworks 401a-m. All container supports 402 being rotatable relative to each other. Other numbers of container supports 402 could be present as appropriate. Preferably there are more than five container supports 402, more preferably more than ten.

Figure 15:
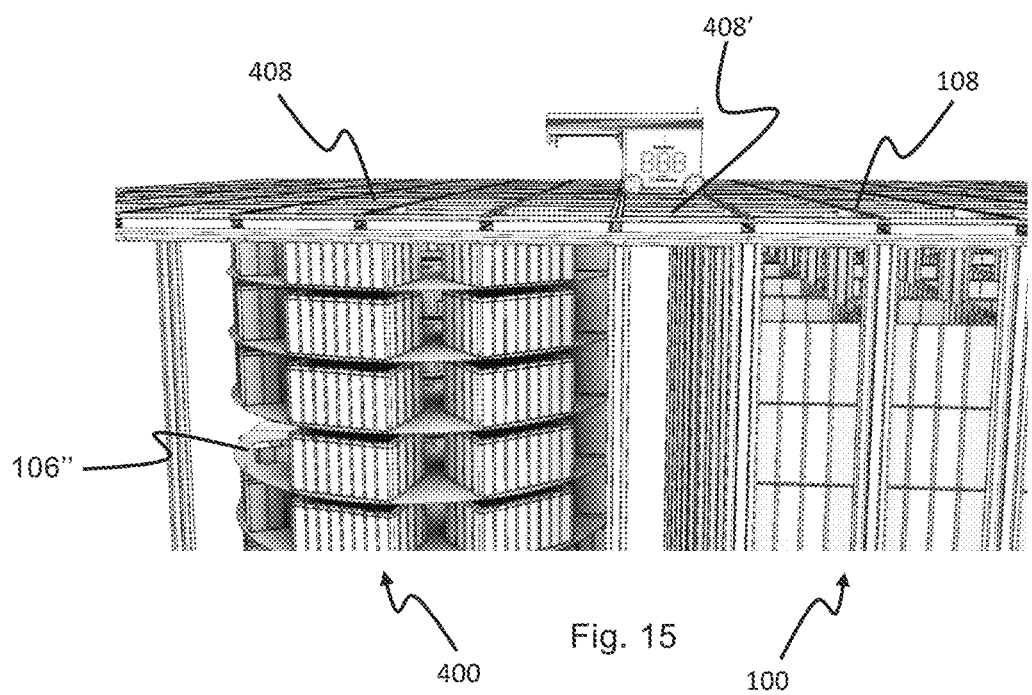
FIG. 15 is a side view of the storage system of FIG. 14.

In order to enable movement between the storage grid 100 and the storage tower 400, a coupling rail system 408' is seen e.g. in FIG. 15 interconnecting the rail system 108 of the prior art storage grid 100 and the rail system 408 of the inventive storage tower 400. The rail system 408 of the inventive storage tower 400 and the rail system 108 of the prior art storage grid 100 have a mutual orientation and design such that the same type of vehicles 301 may operate on both rail systems 108,408. Due to the different construction of the container supports 402 of the inventive storage tower 400 and the stacks 107 of storage containers 106 of the prior art storage grid 100, the rails 410,411 above the container supports 402 may be made wider compared to the rails 110,111 above the stacks 107, at least in one of the X-Y directions. To ensure a grid opening 415 that the storage containers 106 can pass through, the rails 410,411 above the container support 402 may be made deeper, i.e. in the Z direction.

Both the inventive storage tower 400 and the prior art storage grid 100 can be of any size. In particular it is understood that the storage tower 400 and/or the storage grid 100 can be considerably wider and/or longer and/or deeper than disclosed in the accompanied figures. For example, storage tower 400 and/or the storage grid 100 may have a horizontal extent having space for more than 700×700 storage containers 106 and a storage depth of more than fourteen storage containers 106.

Figure 10:
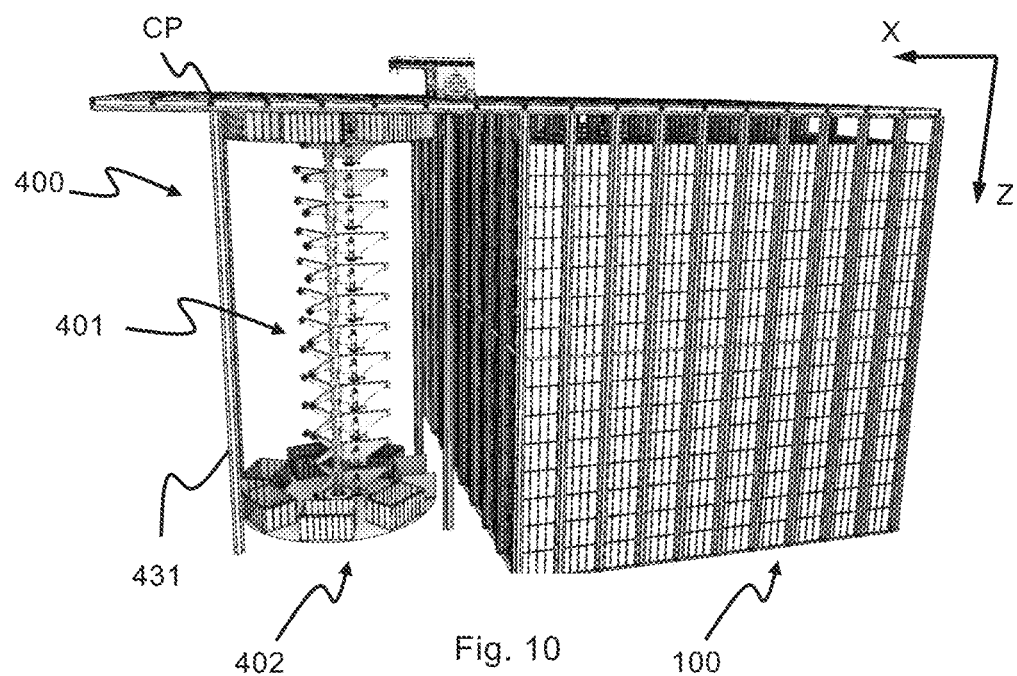
FIG. 10 is a side view of the storage system of FIG. 9 where all container supports apart from the lowermost and uppermost are removed from the storage tower.

One way of installing the storage tower 400 as described above can be to remove all stacks 107 of storage containers 106 and most of the vertical pillars 431 beneath a rail system 108 part of a prior art storage and retrieval system 1 as shown in FIG. 1, leaving a cantilever part CP of the rail system 108 and some vertical pillars 431 as shown in FIG. 10. Then inserting one or more inventive storage towers 400 within the empty volume below the cantilever part CP of the rail system 108. In FIG. 10 some of the container supports 402 are removed to illustrated how the container supporting frameworks 401 can be placed on top of each other with no space between them.

Figure 13:
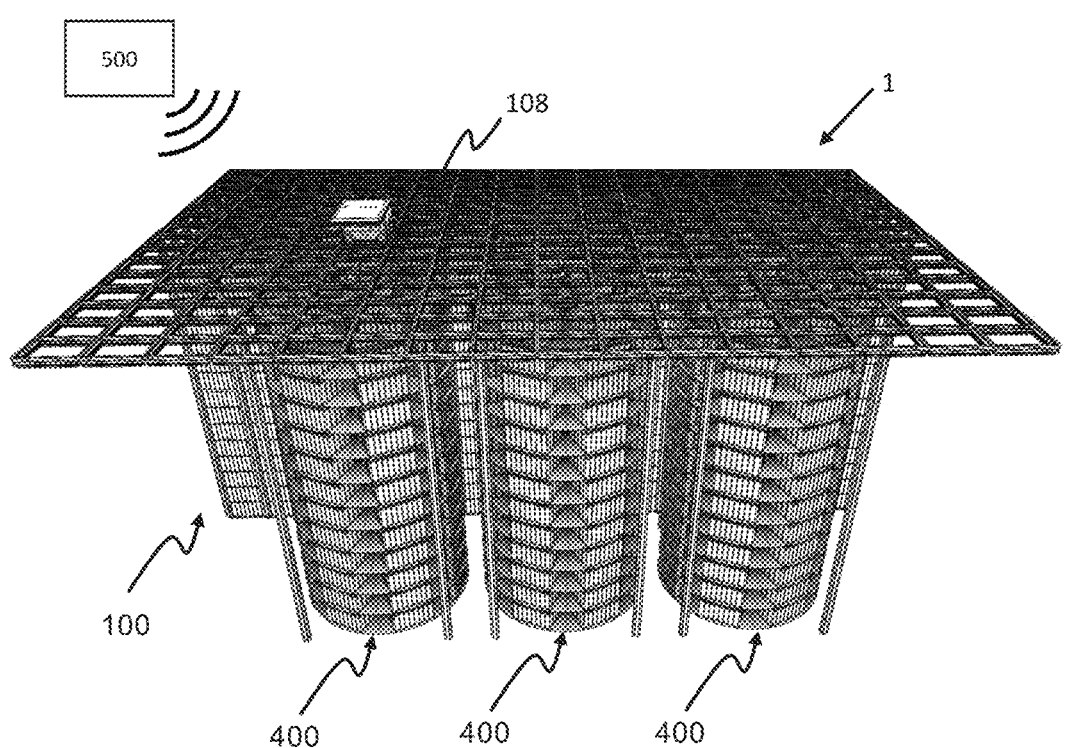
FIG. 13 is a perspective view of another embodiment of the storage system according to the invention, where a storage grid and a plurality of storage towers are positioned side by side and below a rail system.
Figure 14:
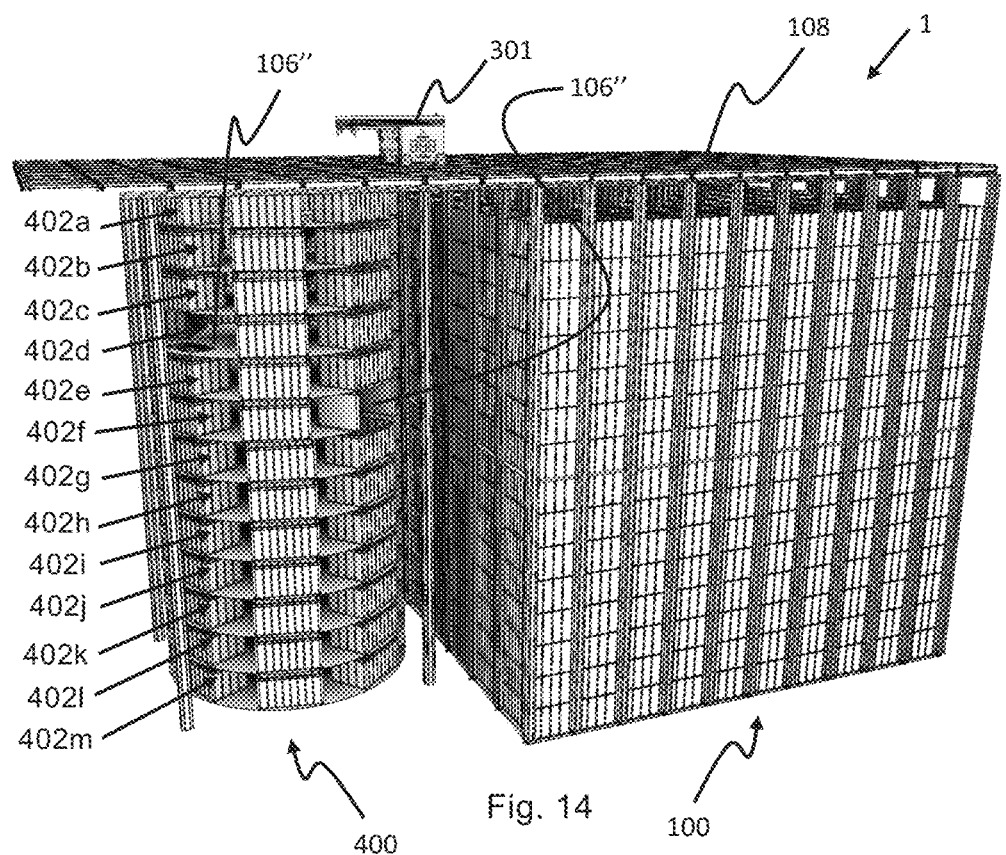
FIG. 14 is a side view of the storage system of FIG. 9 where the storage tower has two vacant container spaces.

FIG. 13 shows an embodiment of a storage and retrieval system 1 where a plurality of storage towers 400 are arranged side by side and adjacent to a storage grid 100. In the example of FIG. 13, three storage towers 400 and one storage grid are arranged below the same rail system 108. In the example of FIG. 14, one storage towers 400 and one storage grid are arranged below the same rail system 108.

FIG. 14 shows a storage tower 400 with a plurality of container supports 402*a-m*. This example shows thirteen container supports 402. The fourth container support 402*d* when counting from above has a vacant container space 106". Also, the sixth container support 402*f* when counting from above has a vacant container space 106".

In the preceding description, various aspects of the automated storage and retrieval system and associated method of picking product items using vehicles have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

| | |
|---|---|
| 1 | Storage and retrieval system |
| 80 | Product items |
| 100 | Framework structure/prior art storage grid/second storage grid |
| 102 | Upright members of framework structure |
| 103 | Horizontal members of framework structure |
| 104, 104a-c | Container space, first-third container space |
| 105 | Storage column |
| 106 | Storage container |
| 106' | Particular position of a storage container/target storage container |
| 106" | Vacant container space for a storage container |
| 107 | Stack |
| 108 | Prior art rail system |
| 110 | Parallel rails in first direction (X) |
| 110a | First rail in first direction (X) |
| 110b | Second rail in first direction (X) |
| 111 | Parallel rail in second direction (Y) |
| 111a | First rail of second direction (Y) |
| 111b | Second rail of second direction (Y) |
| 115 | Grid opening |
| 119 | First port column |
| 120 | Second port column |
| 201 | Prior art storage container vehicle |
| 201a | Vehicle body of the storage container vehicle 101 |
| 201b | Drive means/wheel arrangement, first direction (X) |
| 201c | Drive means/wheel arrangement, second direction (Y) |
| 301 | Prior art cantilever storage container vehicle/remotely operated vehicle |
| 301a | Vehicle body of the vehicle 301 |
| 301b | Drive means in first direction (X) |
| 301c | Drive means in second direction (F) |
| 304 | Lifting device |
| 400 | Storage tower |
| 401 | Horizontally extending container supporting framework |
| 401a | First container supporting framework |
| 401b-m | Second/underlying container supporting framework(s) |
| 402, 402a-m | Container support |
| 403, 403a-c | Opening (in container support 402) |
| 403' | Target opening |
| 404 | Support plate for storage container |
| 405 | Arm |
| 406 | Rotational device of the static part/container supporting framework |
| 407 | Guide post |
| 408 | Rail system |
| 408' | Coupling rail system |
| 409 | Guiding structure (for opening) |
| 410 | A first set of parallel rails |
| 411 | A second set of parallel rails |
| 415 | Grid opening |
| 422 | Grid cell |
| 431 | Vertical pillar |
| 440 | Floor |
| 450 | Supporting structure (with vertical axis) |
| 500 | Control system |
| 700 | Drive mechanism |
| X | First direction |
| Y | Second direction |
| Z | Third direction |
| $P_{rs}$ | Horizontal plane |
| $W_f$ | Width of storage container |
| $L_f$ | Length of storage container |
| $H_f$ | Height of storage container |
| $A_f$ | Areal of storage container |
| $v_{r-1}$ | Offset between lower edge of rail system and lower edge of first container supporting framework |
| $\Delta dV$ | Offsets between lower edge of container supporting framework below the first container supporting framework |
| CP | Cantilever part of the rail system (108) or traveling crane system |
| $A_v$ | Vertical axis (of the supporting structure 450) |
| $r_1$ | First radial distance |
| $r_2$ | Second radial distance |
| $r_3$ | Third radial distance |

The invention claimed is:

1. A storage tower for storing storage containers, wherein the storage tower comprises:
a vertically extending supporting structure having a vertical axis, and
m horizontally oriented container supports arranged along the vertical axis of the supporting structure and supported by container supporting frameworks, the container supports being distributed at vertical intervals and m being a positive integer of 2 or more, to provide different levels where storage containers can be stored,
wherein each container support is rotationally connected to the support structure and configured to support at least one storage container,
wherein each level of a number l of the container supports, l being a positive integer of 1 to m−1, that are arranged above the remaining levels of m−l container supports is configured to display at least one opening having a size being at least a maximum horizontal cross section of the storage containers to be stored,
wherein the l container supports are configured to rotate about the vertical axis independently such that at least one opening of each level of the l container supports is vertically alignable with at least one opening of the other levels of the l container supports by individual rotation of the container supports; and
wherein each container support comprises vertical guide plates arranged at least partly around the perimeter of each of the at least one opening, wherein the vertical guide plates are configured to align a storage container being lifted or lowered into the respective opening in the horizontal plane.

2. The storage tower of claim 1, further comprising a drive mechanism configured to rotate the at least one container support relative to the vertical axis.

3. The storage tower of claim 1, wherein each of the m container supports comprises a plurality of first container spaces distributed in an arc on the container support such that the plurality of first container spaces are circumferentially offset with an equal, or near equal, first radial distance from the vertical axis.

4. The storage tower of claim 3, wherein each of the container supports further comprise a plurality of second container spaces distributed in an arc on the at least one horizontally oriented container support such that the plurality of second container spaces are circumferentially offset with an equal, or near equal, second radial distance from the vertical axis, the second radial distance being larger than the first radial distance.

5. The storage tower of claim 1, wherein each container support has a toroid-shaped horizontal cross-section.

6. The storage tower of claim 1, wherein the supporting structure is a central pole or a peripheral housing, or a combination of a central pole and a peripheral housing.

7. The storage tower of claim 1, wherein each container supporting framework comprises a plurality of container supports, wherein the plurality of container supports are coaxially arranged and rotatable relative to each other.

8. The storage tower of claim 3, wherein the plurality of first container spaces of at least one container supporting framework are distributed on a plurality of container supports.

9. The storage tower of claim 1, wherein each of the container supporting frameworks further comprises:
a static part connected in a non-rotating manner to the support structure, wherein the static part is provided with a rotational device; and
wherein the at least one horizontally oriented container support is rotationally coupled to the static part.

10. The storage tower of claim 9, wherein the rotational device constitutes part of a drive mechanism.

11. The storage tower of claim 9, wherein the static part forms arms extending horizontally in a radial direction from the vertical axis of the supporting structure, wherein the rotational device is arranged at a distal end of the arms.

12. The storage tower of claim 11, wherein each horizontally extending arm comprises a plurality of rotational devices configured to support individual container supports and to allow rotation of the individual container supports relative to each other.

13. The storage tower of claim 11, wherein the horizontally extending arms are provided in sets of different lengths, wherein each set is configured to support individual coaxially arranged container supports.

14. The storage tower of claim 1, wherein the container supports comprise guide posts configured to guide the storage containers into position on container spaces.

15. The storage tower of claim 1, wherein the storage tower further comprises a transport mechanism arranged above the uppermost container supporting framework or the uppermost container support at a first vertical offset being at least a maximum height of the storage containers to be stored.

16. The storage tower of claim 1, wherein the storage tower further comprises a rail system arranged above the uppermost container supporting framework or the uppermost container support.

17. The storage tower of claim 16, wherein the rail system is arranged above the uppermost container supporting framework or the uppermost container support at a first vertical offset being at least a maximum height of the storage containers to be stored.

18. The storage tower of claim 16, wherein the uppermost container supporting framework or the uppermost container support is arranged at a distance below a lower edge of the above adjacent rail system corresponding to a height that is equal or higher than a maximum height of a stack of several storage containers.

19. An automated storage and retrieval system configured to store a plurality of storage containers, comprising:
one or more storage towers comprising:
a vertically extending supporting structure having a vertical axis, and
m horizontally oriented container supports arranged along the vertical axis of the supporting structure and supported by container supporting frameworks, the container supports being distributed at vertical intervals and m being a positive integer of 2 or more, to provide different levels where storage containers can be stored,
wherein each container support is rotationally connected to the support structure and configured to support at least one storage container,
wherein each level of a number l of the container supports, l being a positive integer of 1 to m-1, that are arranged above the remaining levels of m-l container supports is configured to display at least one opening having a size being at least a maximum horizontal cross section of the storage containers to be stored,
wherein the l container supports are configured to rotate about the vertical axis independently such that at least one opening of each level of the l container supports is vertically alignable with at least one opening of the other levels of the l container supports by individual rotation of the container supports; and
wherein each container support comprises vertical guide plates arranged at least partly around the perimeter of each of the at least one opening, wherein the vertical guide plates are configured to align a storage container being lifted or lowered into the respective opening in the horizontal plane;
a plurality of storage containers supported on the plurality of container supports;
wherein each container support comprises vertical guide plates arranged at least partly around the perimeter of each of the at least one opening, wherein the vertical guide plates are configured to align a storage container being lifted or lowered into the respective opening in the horizontal plane;
a remotely operated vehicle configured to move laterally above at least a part of the plurality of container supports, wherein the remotely operated vehicle comprises a lifting device configured to grab and vertically lift a storage container; and
a control system configured to monitor and control wirelessly movements of the remotely operated vehicle.

20. The automated storage and retrieval system of claim 19, further comprising:

a storage grid comprising:
- a plurality of vertical storage columns configured to stack storage containers on top of one another;
- a rail system on which a plurality of container handling vehicles are configured to operate;
- the rail system being arranged above the plurality of storage columns, wherein storage containers stored in the storage columns are accessible by the container handling vehicles through grid openings in the rail system;
- the rail system comprising a cantilever part with a horizontal extent being equal to the difference between the horizontal extent of the rail system and the horizontal extent of the plurality of storage columns; and
- wherein one or more of the storage towers are at least partly arranged below the cantilever part of the rail system and positioned such that the/container supports are configured to rotate about the vertical axis independently such that at least one opening of each of the/container supports is vertically alignable with at least one opening of other of the/container supports by rotation of the container support.

21. The automated storage and retrieval system of claim 19, further comprising:
a storage grid comprising:
- a plurality of vertical storage columns configured to stack storing containers one on top of one another;
- a transport mechanism wherein the remotely operated vehicle is a crane being moveable along a sliding bar arranged in parallel to a first direction;
- the sliding bar having two opposite ends configured to move along two fixed bars arranged in parallel to a second direction;
- the transport mechanism being arranged above the plurality of storage columns;
- the transport mechanism comprises a cantilever part with a horizontal extent being equal the difference between the horizontal extent of the transport mechanism and the horizontal extent of the plurality of storage columns; and
- wherein the one or more of the storage towers are at least partly arranged below the cantilever part of the transport mechanism.

22. The automated storage and retrieval system of claim 19, wherein the storage tower further comprises a rail system arranged above the uppermost container supporting framework or the uppermost container support at a first vertical offset being at least a maximum height of the storage containers to be stored.

23. The automated storage and retrieval system of claim 22, wherein at least one of the container supporting frameworks is arranged at a distance below a lower edge of the above adjacent rail system corresponding to a height that is equal to or higher than a maximum height of a stack of several storage containers.

24. A method for storing and retrieving storage containers from an automated storage and retrieval system, the automated storage and retrieval system configured to store a plurality of storage containers comprising:
one or more storage towers comprising:
- a vertically extending supporting structure having a vertical axis, and
- m horizontally oriented container supports arranged along the vertical axis of the supporting structure and supported by container supporting frameworks, the container supports being distributed at vertical intervals and m being a positive integer of 2 or more, to provide different levels where storage containers can be stored,
- wherein each container support is rotationally connected to the support structure and configured to support at least one storage container,
- wherein each level of a number l of the container supports, l being a positive integer of 1 to m-1, that are arranged above the remaining levels of m-l container supports is configured to display at least one opening having a size being at least a maximum horizontal cross section of the storage containers to be stored,
- wherein the l container supports are configured to rotate about the vertical axis independently such that at least one opening of each level of the l container supports is vertically alignable with at least one opening of the other levels of the l container supports by individual rotation of the container supports; and
- wherein each container support comprises vertical guide plates arranged at least partly around the perimeter of each of the at least one opening, wherein the vertical guide plates are configured to align a storage container being lifted or lowered into the respective opening in the horizontal plane;
a plurality of storage containers supported on the plurality of container supports;
wherein each container support comprises vertical guide plates arranged at least partly around the perimeter of each of the at least one opening, wherein the vertical guide plates are configured to align a storage container being lifted or lowered into the respective opening in the horizontal plane;
a remotely operated vehicle or a crane configured to move laterally above at least a part of the plurality of container supports, wherein the remotely operated vehicle or the crane comprises a lifting device configured to grab and vertically lift a storage container;
a control system configured to monitor and control wirelessly movements of the remotely operated vehicle;
wherein each of the container supports comprise a plurality of first container spaces distributed on the at least one horizontally oriented container support such that the plurality of first container spaces are circumferentially offset with an equal, or near equal, first radial distance from the vertical axis;
wherein the method comprises:
- moving the remotely operated vehicle or the crane to a position where its lifting device can be aligned vertically with a target storage container positioned on one of the first container spaces or to a position where its lifting device can be aligned vertically with one or more aligned openings of the container supports;
- where necessary, rotating the container support on which the target storage container is supported to position the target storage container in vertical alignment below the position of the remotely operated vehicle or the crane;
- where necessary, and if the container support on which the target storage container is supported is not the uppermost container support;
- rotating the above container support, or each of the above container supports, to a circumferential position in which the lifting device has direct vertical access to the target storage container through the at least one opening;
grabbing and lifting the target storage container by use of the lifting device; and
moving the remotely operated vehicle with the target storage container to a horizontally different location.

25. The method of claim 24, wherein the remotely operated vehicle or the crane is carrying a storage container to be stored in the automated storage and retrieval system either before or after retrieval of the target storage container;
wherein the method comprises:
moving the remotely operated vehicle or the crane to a position where its lifting device can be aligned vertically with a vacant container space or to a position where its lifting device can be aligned vertically with one or more aligned openings of the container supports;
where necessary, rotating the container support of the vacant container space to position the vacant container space in vertical alignment below the position of the remotely operated vehicle or the crane;
if the container support of the vacant container space is not the uppermost container support;
rotating the above container support, or each of the above container supports, to a circumferential position in which the lifting device has direct vertical access to the vacant container space through the at least one opening; and
lowering the carried storage container into position on the vacant container space by use of the lifting device.

26. The method of claim 25, wherein the automated storage and retrieval system comprises a storage grid containing a target storage container,
wherein the method comprises:
picking the target storage container from the storage grid;
storing the target storage container in the storage tower according to claim 25; and
retrieving the storage container from the storage tower according to claim 24.

27. A method for delivering items arranged within storage containers stored in storage towers directly to end users by an automated storage and retrieval system configured to store a plurality of storage containers, the automated storage and retrieval system comprising:
one or more storage towers comprising:
a vertically extending supporting structure having a vertical axis, and
m horizontally oriented container supports arranged along the vertical axis of the supporting structure and supported by container supporting frameworks, the container supports being distributed at vertical intervals and m being a positive integer of 2 or more, to provide different levels where storage containers can be stored,
wherein each container support is rotationally connected to the support structure and configured to support at least one storage container,
wherein each level of a number l of the container supports, l being a positive integer of 1 to m-1, that are arranged above the remaining levels of m-l container supports is configured to display at least one opening having a size being at least a maximum horizontal cross section of the storage containers to be stored,
wherein the l container supports are configured to rotate about the vertical axis independently such that at least one opening of each level of the l container supports is vertically alignable with at least one opening of the other levels of the l container supports by individual rotation of the container supports; and
wherein each container support comprises vertical guide plates arranged at least partly around the perimeter of each of the at least one opening, wherein the vertical guide plates are configured to align a storage container being lifted or lowered into the respective opening in the horizontal plane;
a plurality of storage containers supported on the plurality of container supports;
a remotely operated vehicle configured to move laterally above at least a part of the plurality of container supports, wherein the remotely operated vehicle comprises a lifting device configured to grab and vertically lift a storage container; and
a control system configured to monitor and control wirelessly movements of the remotely operated vehicle,
the method comprising:
delivering an item of a storage container of the plurality of storage containers to an end user.

* * * * *